United States Patent [19]
Ueda et al.

[11] 3,843,878
[45] Oct. 22, 1974

[54] FLASH DEVICE FOR A PHOTOGRAPHIC CAMERA

[75] Inventors: Hiroshi Ueda, Nara; Masatake Niwa, Osaka, both of Japan

[73] Assignee: Minolta Camera Kabushiki Kaisha, Osaka-shi, Osaka-fu, Japan

[22] Filed: July 18, 1973

[21] Appl. No.: 380,239

[30] Foreign Application Priority Data
July 31, 1972  Japan.............................. 47-90657

[52] U.S. Cl............ 240/1.3, 240/46.03, 240/46.45, 240/46.53
[51] Int. Cl. ............................................ G03b 15/02
[58] Field of Search............... 240/1.3, 46.03, 46.45, 240/46.47, 46.53, 46.59

[56] References Cited
UNITED STATES PATENTS

| | | | |
|---|---|---|---|
| 2,310,509 | 2/1943 | Brandt | 240/1.3 |
| 2,789,205 | 4/1957 | Schwartz et al. | 240/1.3 |
| 2,972,673 | 2/1961 | Graef | 240/1.3 |
| 3,001,461 | 9/1961 | Irwin | 240/1.3 X |
| 3,111,274 | 11/1963 | Turano | 240/1.3 |
| 3,167,256 | 1/1965 | Elliott | 240/1.3 |

Primary Examiner—Fred L. Braun
Attorney, Agent, or Firm—Watson, Cole, Grindle & Watson

[57] ABSTRACT

A flash device for use in a photographic camera having a filter which is movable between a rest position at which the filter is retracted from the light path of light rays coming from the flash device, and an operational position at which the light rays pass through the filter. When the filter is in its rest position, it is housed within a casing of the flash device located on a guide plate provided along one side wall of the casing, the casing having a front opening for passing rays of light issued from the flash device. In the use of the filter, it is pulled slidingly toward the front along the guide plate to a position outside the casing and then moved to its operational position at which the filter covers the entire opening of the casing.

14 Claims, 13 Drawing Figures

FLASH DEVICE FOR A PHOTOGRAPHIC CAMERA

BACKGROUND OF THE INVENTION

This invention relates generally to a flash device for use in a photographic camera, and more particularly to such a device having a filter or filters therein, in which the filter is shifted from a rest position, at which it is retracted from the light path of light rays coming from the flash device, to an operational position at which the rays of light pass the filter, and vice versa.

In known flash devices, various types of filters are removably mounted at the opening thereof. Accordingly, the color may be changed or the amount of light rays to be projected from the flash device to the photographic object may be varied. Also, such flash devices serve to diffusely irradiate over the entire photographic field to be photographed, or to concentrate light rays to the specific photographic object in the photographic field. Moreover, the flash device may be used to effect a wide-angle diffusion irradiation for application of light rays to the entire photographic field to be photographed by using a wide-angle lens as the objective lens.

In such instances, however, a filter must be carried by the photographer in addition to the camera and the flash device, and must mount the filter to the flash device when necessary. This is not only quite troublesome for the photographer, but oftentimes the photographer may forget to bring the filter or may leave it behind. Also, a shutter opportunity may be missed during the mounting of the filter to the flash device, or the filter may be accidently damaged when carrying it.

Another type of flash device is known in which the filter is kept mounted in the flash device, the filter being adapted to be slid along the opening of the flash device so as to be moved between a position at which it is retracted from the opening and a position at which it covers the opening. This type of flash device, however, gives rise to other disadvantages in that the dimension of the flash device is inevitably increased to twice the opening, thereby creating a bulky flash device. Also, the filter is susceptible to damage and, in some cases, an unusual projection of light occurs due to an imperfect shift of the filter so as to expose a portion of the opening, in which case part of the light rays coming from the flash device passes the filter and the remainder of light rays are projected on to the photographic object without passing through the filter.

OBJECTS OF THE INVENTION

This invention is intended to eliminate the drawbacks noted for the aforedescribed conventional flash device. Accordingly, an object of the invention is to provide a flash device for use in a photographic camera, wherein a filter is housed within the flash device, the filter being shifted between a rest position at which it is retracted from the path of light rays projected from the flash device to a photographic object, and an operational position at which the light rays pass the filter, the filter being retained in either position in a stable manner.

Another object of the invention is to provide a flash device for use in a photographic camera, wherein the filter, when in the rest position, is maintained within a casing of the flash device, with its surface for passing light rays being perfectly covered by the casing.

A further object of this invention is to provide a flash device for use in a photographic camera, wherein the filter in its rest position is pulled outwardly from the casing, after which the filter is rotated with respect to the casing to assume its operational position.

A still further object of this invention is to provide a flash device for use in a photographic camera, in such a manner that movement of the filter housed in the flash device is avoided, and the filter is retained in a stable condition in its rest position or in its operational position.

A still further object of this invention is to provide a flash device for use in a photographic camera, in which the filter housed within the flash device is movable between its rest position and its operational position, and interchange of the filter is easily facilitated.

These and other objects of this invention will become more apparent from the following description of the invention.

SUMMARY OF THE INVENTION

The invention relates to a flash device for use in a photographic camera, wherein a filter housed within the flash device is disposed between a flash means and a wall of the casing of the flash device. The filter is slidable by means of guide members provided on either the side walls of the casing, along a guide plate or on the side walls of the filter frame. The filter may be thereby shifted between a rest position and an operational position. By such rest position is meant the portion at which the filter is outside of a light path of light rays coming from the flash means and faces the guide plate arranged substantially parallel to an optical path thereof. By such operational position is meant the portion at which the filter covers an opening of the casing for passing light coming from the flash means. The filter is pulled out from the casing toward the opening thereby covering the opening of the casing.

A principal feature of this invention is that the filter in its rest position is located substantially parallel to an optical axis of the light path of the flash means and between the flash means and the casing. The filter, after being pulled toward the opening of the casing, is turned to cover the opening for passing such light rays.

Another feature of this invention is that guide means for sliding the filter within the casing include guide pins provided on either the side walls of the casing or the side walls of the filter, and guide slots loosely receiving the guide pins therein and formed on either the filter or the casing on which guide pins are not provided, such guide pins serving to facilitate the rotation of the filter in the pulled-out position.

Accordingly, guide slots, even if they are formed on the casing or on the filter frame, have a longitudinal length corresponding to a distance from the rest position at which the filter is completely housed within the casing to the pulled-out position at which the filter has been drawn out towards the opening of the casing; namely, corresponding to a length of the filter sufficient to cover the opening of the casing when the filter assumes its operational position. The position of the guide pins is such that, when the guide pins are provided on the casing wall, they are arranged on opposite side edges along one wall of the casing on the side opening thereof. When the guide pins are provided on the filter frame, they are arranged on those both side edges of the filter frame in its rest position which are contiguous to the end opposite the side of the opening.

Still another feature of this invention is to avoid accidental movement of the filter when in its rest position or in its operational position.

For ensuring stable retention of the filter, it is desirably made slidable along the upper wall of the casing.

Still another feature of this invention is that, when the filter is in the pulled-out position from the casing and if the filter is further pulled by a stronger force, engagement between the guide pins and the guide slots is released thereby separating the filter from the casing. This affords an exchange or selection of a filter relative to the casing. At least one end of each guide slot receiving a guide pin therein should be formed as resiliently deformable to facilitate filter exchangeability.

When the guide slots are formed on the casing walls, ends of the guide slots on the side of the opening should be resiliently deformable and, when the guide slots are formed on the filter frame, the ends of the guide slots opposite the side of the opening should be resiliently deformable.

BRIEF DESCRIPTION OF THE DRAWINGS

FIGS. 8 through 10 show still another embodiment, wherein

DETAILED DESCRIPTION OF THE INVENTION

Figure 1:
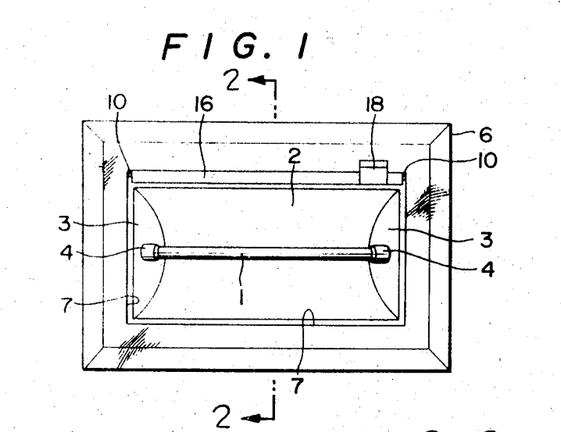
FIG. 1 is a front elevational view of a flash device in accordance with an embodiment of the invention.
Figure 2:
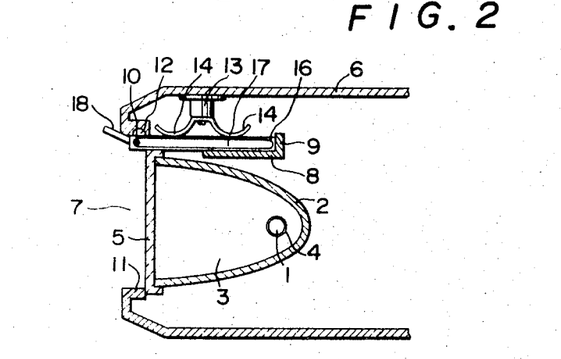
FIG. 2 is a sectional side of part of the flash device of the FIG. 1 embodiment taken along line 2—2 thereof, with a filter shown in its rest position.

Referring to FIGS. 1 to 4 of the drawings, an electronic flash tube 1 is located at a focal line at which light rays reflect from a curved reflector 2. The flash tube is mounted by means of electrodes 4 at its ends to flat reflecting plates 3 located at opposite sides of reflector 2. A panel 5, of transparent plastic material or the like, covers the front opening of reflector 2, and is fitted at the front edge of the reflector, as shown in FIG. 2. Panel 5 serves to adjust the color balance of the light emitted by the flash tube and to protect the electronic flash tube 1 as well as to prevent the user from touching electrodes, thereby eliminating the danger of electric shock. These components constitute a flash device which is fixedly mounted within a casing 6.

The casing has a front portion provided with a square opening 7 through which flash light is projected from the flash device. The flash device is, of course, enclosed by side walls and a rear wall (not shown) of casing 6.

A ledge-shaped guide plate 8 is located within the casing and is located between the flash device and an upper wall of the casing.

Figure 4:
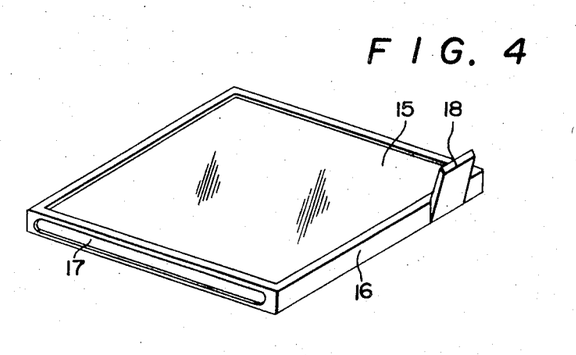
FIG. 4 is a perspective view of a filter used in the FIG. 1 embodiment.

A filter 15 is provided of a size substantially equal to square opening 7, and of a dimension sufficient to cover the entire face of panel 5. Filter 15 is mounted within a filter frame 16 having opposite sides thereof provided with guide slots 17, and a front end thereof having a knob or projection 18.

Guide pins 10 are provided at the upper opposite sides of the casing along the upper edge of opening 7, and are located slightly upwardly of guide plate 8. As seen in FIG. 2, filter 15 is disposed parallel to plate 8 and rests thereon. It can therefore be slidingly moved along guide plate 8. Also, the guide plate has an upright projection 9 serving as a stopper for the filter, and locates knob 18 outwardly of the casing when the filter is inserted. A leaf spring 14 is attached to the inner surface of the top wall of casing 6 by means of a support 13 so as to resiliently urge filter frame 16 against guide plate 8. This is the rest position of filter 15 at which the filter is retracted from the light path.

In order to shift the filter from its rest position to an operational position, projection or knob 18 is pulled to move the filter frame 16 outwardly of the casing until guide slots 17 of the frame are brought into sliding engagement with guide pins 10. The filter frame is then pivoted about guide pins 10 through 90° in a counter-clockwise direction as viewed in FIG. 2 until knob 18 is brought into contact with the lower edge of opening 7. The filter is then in a position of FIG. 3 at which it entirely covers the light path of light rays projected from the flash device through the opening.

Figure 3:
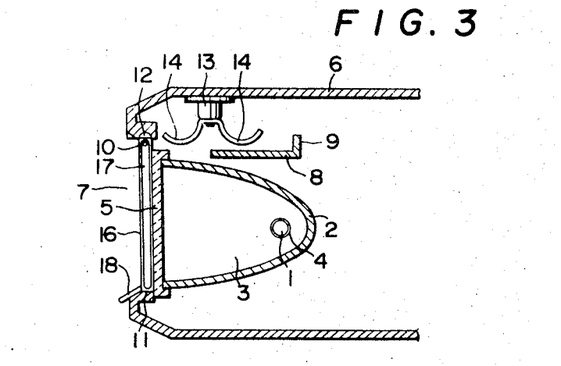
FIG. 3 is a view similar to FIG. 2 showing the filter in operational position.

By reversing the above-described procedures, filter 15 is returned from its operational position of FIG. 3 to its rest position of FIG. 2.

Figure 5:
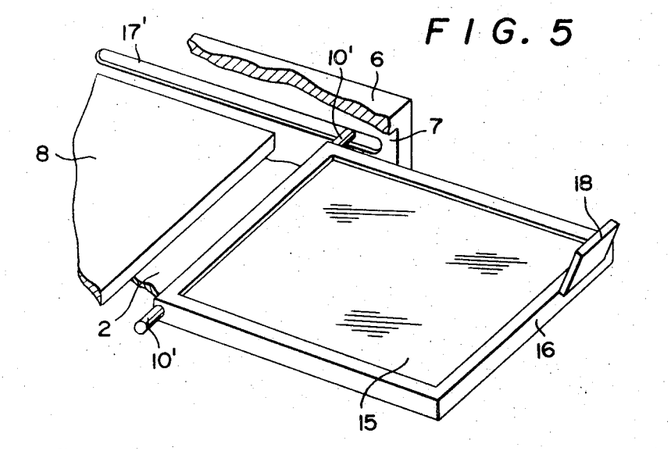
FIG. 5 is a perspective view of an essential part of the flash device in accordance with another embodiment of the invention.

Although guide pins 10 are described as provided on both sides along the upper wall of casing 6, and guide slots 17 are shown formed on opposite sides of the filter frame, it should be pointed out that location of the guide pins and the guide slots may be interchanged, namely, the former may be provided on filter frame 16 and the latter may be formed on 6. Such modification is illustrated in FIG. 5 as a second embodiment. In FIG. 5, elements similar to FIGS. 1 to 4 embodiment have the same reference numerals. Here, guide pins 10' extend outwardly of the rearward ends of the filter frame opposite the front side thereof at which knob 18 is located, and are of a size loosely fitting within guide slots 17' on casing 6.

Figure 6:
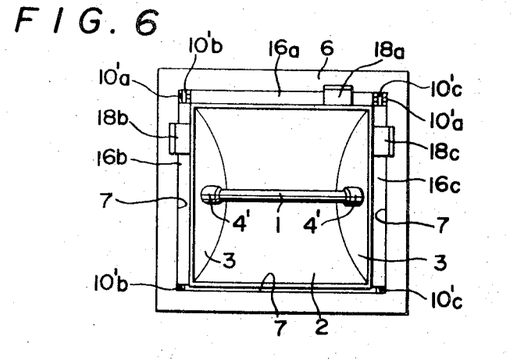
FIG. 6 is a front elevational view of a flash device in accordance with yet another embodiment of the invention.

Another embodiment of the flash device is shown in FIG. 6 wherein a plurality of filters 15 are provided in the casing in a manner to permit respective filters to be alternately shifted between a rest position and an operational position. Such plurality of filters include a first filter frame 16a having a knob or projection 18a, the first filter frame being slid along the upper edge of opening 7 and pivoted as described with reference to FIGS. 2 and 3. Second and third filter frames 16b and 16c having respective knobs 18b and 18c are slid along the left and right side edges of opening 7, and are respectively pivoted in the same manner as frame 16a. Guide pins 10a', 10b' and 10c' are provided on first, second and third guide frames 16a, 16b and 16c, respectively. In this way, the guide pin on first filter 16a does not interfere with the sliding movement of the second and third filter frames. Also, guide slots (not shown) are provided on casing 6 for each of the sets of guide pins 10a', 10b', 10c' in the same manner as in FIG. 5.

In the above-described embodiments, the filter is retained at its operational position by frictional engagement of the front lower edge of filter frame with the lower edge of opening 7. To insure the stability of such retention of the filter in its operational position, reference is made to FIG. 7 which shows the use of a leaf spring 14' attached to a support 13' of casing 6, and having a projected end located above guide pin 10 provided on the casing, and adapted to abut against the upper face of filter frame 16 in its rest position. Filter frame 16 is formed with a notch or cut-away portion 19 adapted to engage the projected end of leaf spring 14'. In addition, an engaging projection 20 serving as a stopper is formed at the lower edge 11 of opening 7 of the casing. The knob, in this embodiment, is arranged to slightly project forwardly of opening 7 when filter frame 16 is in its rest position within the casing. The knob is provided with a depression 18' for the convenience of pulling the filter frame by the finger of the operator.

Figure 7:
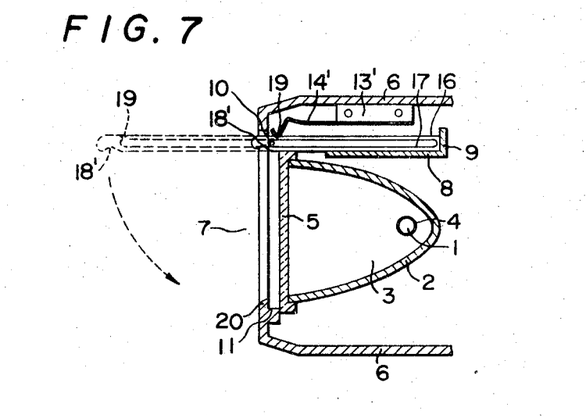
FIG. 7 is a sectional side view of part of a flash device in accordance with still another embodiment of the invention.

Accordingly, when filter frame 16 is in its rest position within the casing as shown in solid lines in FIG. 7, leaf spring 14' resiliently presses against filter frame 16 with its projection in engagement with notch 19, thereby maintaining filter frame 16 in its rest position.

In shifting filter frame 16 from its rest position to its operational position, it is pulled outwardly by the operator with the aid of depression 18' so as to disengage the projected end of the spring from engaging notch 19 and into a position shown in broken lines in FIG. 7. Then, filter frame 16 is pivoted through 90° in the direction of the arrow, after which it is slightly pushed upwardly against the force of spring 14' until the lower edge of frame 16 is moved inwardly of projection 20 to rest upon the lower edge 11 of the opening. Thus, filter frame 16 is maintained in its operational position with its upper edge pressed by the leaf spring 14' and with its lower edge engaging the lower edge of opening 7. Accordingly, despite any extraneous impact on the flash device, the filter frame is retained in its operational position in a stable manner by reason of leaf spring 14' and engaging projection 20. In returning the filter frame 16 to its rest position, it is urged upwardly against the force of leaf spring 14' until the lower edge of the frame is lifted to a level higher than the upper end of engaging projection 20. The filter frame is then rotated clockwise and slid rearwardly to its rest position.

Figure 8:
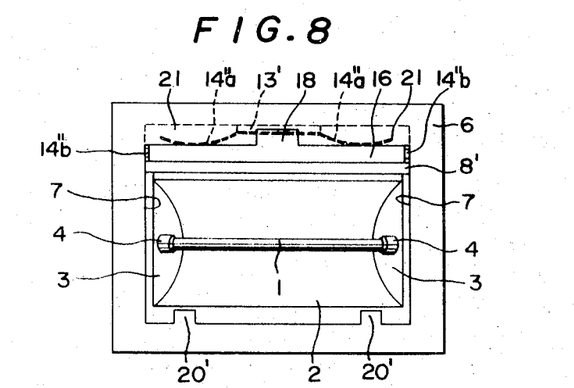
FIG. 8 is a front elevational view.
Figure 9:
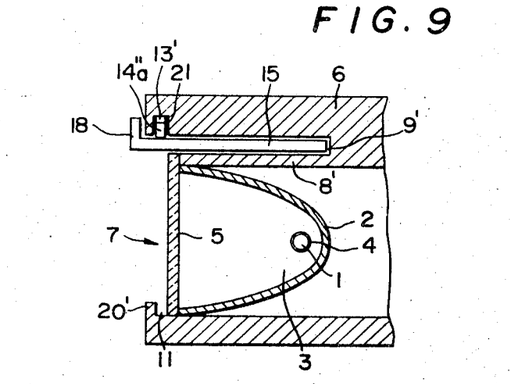
FIG. 9 is a sectional side view with a filter shown in its rest position.
Figure 10:
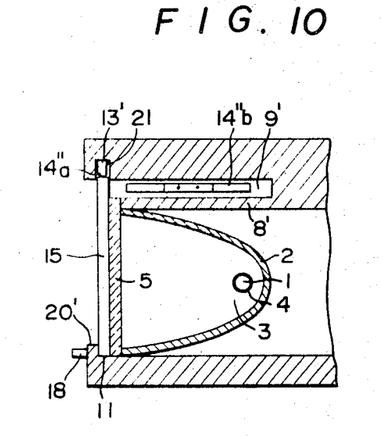
FIG. 10 is a view similar to FIG. 9 showing the filter in its operational position.

FIGS. 8 through 10 show still another embodiment of the flash device wherein no guide pin is used. Here, a filter frame housing or chamber 9' is formed above opening 7 of casing 6, such housing being defined by the casing upper wall, casing opposite side walls and a baffle plate 8' which serves as a guide plate. Leaf springs 14b'' are disposed within chamber 9' at opposite side walls of casing 6, as shown in FIG. 10. The upper wall of casing 6 has an engaging slot 21 opening toward opening 7. A leaf spring 14a'' is mounted on support 13' within engaging slot 21, and resiliently presses down against the front upper face of filter 15 when in its rest position, as shown in FIGS. 8 and 9. At the lower edge of opening 7 of the casing which confronts engaging slot 21, another engaging slot 11 is formed between engaging projection 20' and panel 5. Thus, the filter, in its position as shown in FIG. 9 in which it lies within housing 9', is retained in such position by leaf springs 14b'' located at opposite side walls of housing 9'.

For shifting the filter to its operational position, it is pulled by its knob out of housing 9', rotated 90° counterclockwise, and then pushed upwardly to insert the rear edge thereof in slot 21 against the force of leaf spring 14a''. The rear edge of filter 15 is the upwardly positioning edge when the filter is turned to its operational position. When the lower edge of filter 15 is moved inwardly of engaging projection or stopper 20', the knob is released whereby the lower edge of filter 15 is fitted in the slot 11 thereby retaining the filter 15 in its operational position.

In the several embodiments described with reference to FIGS. 1 to 7, selection of a filter is not available since only a given filter is used with the various flash devices with the exception of the FIG. 6 embodiment wherein a plurality of filters are mounted within the flash device and a desired filter is selected from a plurality of filters when the filter is in use. By contrast, the flash device of the FIGS. 8 to 10 embodiment permits the filter to be exchanged so that any type filter is applicable. One slight drawback is, however, that the easy removal of the filter from the flash device may cause the filter to be pulled completely out of housing 9'.

Figure 11:
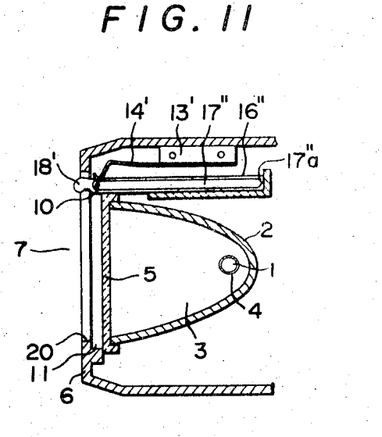
FIG. 11 is a sectional side view of still another embodiment of the invention.
Figure 12:
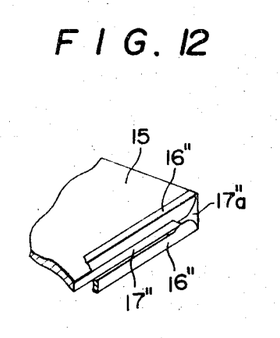
FIG. 12 is a fragmentary perspective view of the filter frame of FIG. 11.
Figure 13:
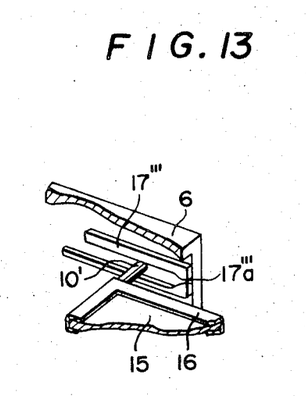
FIG. 13 is a fragmentary view of an essential part of the flash device in accordance with still another embodiment of the invention.

Such is avoided by means of yet another embodiment shown in FIGS. 11 and 12, and still another shown in FIG. 13, wherein exchangeability of the filter is enhanced.

In FIGS. 11, 12, slits 17a'' are formed at the rearward ends of guide slots 17'' formed at opposite sides of filter frame 16, slits 17a'' each having an opening smaller than the diameter of each guide pin 10. Filter frame 16'' is made of a resiliently deformable material. When the filter frame is pulled outwardly, guide pins 10 are brought into engagement with the ends of said slots having slits 17a'' extending from the guide slots, thereby preventing complete removal of the filter frame from the flash device. If filter frame 16'' is further pulled outwardly with a force sufficient to pull said pins through said slits, the slits 17a'' of guide slots 17'' are resiliently deformed by virtue of guide pins 10 so to be enlarged in conformity with the thickness of each guide pin 10, whereby filter 15 is separated from the flash device. In this embodiment, a desired filter may be selectively mounted within the flash device.

In the FIG. 13 embodiment, guide slots are formed on the side walls of the casing, as in the embodiment of FIG. 5, wherein slits 17a''' are formed at the front ends of guide slots 17''''. Due to the resiliency of the material constituting guide slits 17''', such slits are enlarged by guide pins 10' only when the filter is pulled forwardly by a force sufficient to pull said pins through said slits and slits 17a''' thereby permit passage of guide pins 10' therethrough. Complete removal of the filter frame from the flash device is possible only under such a strong pulling force.

Obviously, many other modifications and variations of the invention are made possible in the light of the above teachings. It is therefore to be understood that within the scope of the appended claims, the invention may be practiced otherwise than as specifically described.

What is claimed is:

1. In a flash device, comprising:
   a flash means having an electric flash tube adapted to emit light when flashed;
   a reflector for projecting the light emitted by the flash tube means having a curved reflector;
   a transparent panel covering the front periphery of said reflector and receiving the flash light projected by said reflector means;
   a filter having edges;
   a casing having an opening through which the flash light is projected, said opening defining a plurality of edges;
   housing means located between said reflector means and said casing along one edge of said opening for housing said filter in a rest position within said casing;
   handle means formed near a first edge of said filter and extending outwardly of said opening when said filter is in its rest position;
   means for slidingly guiding said filter into said housing means in said casing;
   means for retaining said filter in an operational position at which said filter covers said opening, said filter being rotatable into its operational position after being slid out from said housing means; and spring means extending into said opening and pressing against a second edge of said filter opposite said first edge when said filter is in its operational position, said spring means facing an edge of the opening;
   said retaining means being defined by a locking projection on said casing located forwardly of the edge of said opening facing said spring means, said locking projection being adapted to frictionally engage with said first edge of said filter when in its operational position to thereby retain said filter in its operational position, and being adapted to release said first edge of said filter against the force of said spring means during a shift of said filter to its rest position.

2. In a flash device according to claim 1, further comprising another spring means mounted on a wall partially defining said housing means in resilient contact with said filter in its rest position, whereby said filter is retained in its rest position in a stable manner.

3. In a flash device according to claim 2, wherein said housing means and said guide means are provided along the uppermost edge of said opening, said handle means being formed near the lower edge of said filter, said first-mentioned spring means extending into said opening and pressing against the uppermost edge of said filter when in its operational position to thereby retain said filter in its operational position, and said locking projection being located on said casing forwardly of the lowermost edge of said opening, and being adapted to frictionally engage with said lowermost edge of said filter when in its operational position.

4. In a flash device, comprising:
   a flash means having an electric flash tube adapted to emit light when flashed;
   a reflector for projecting the light emitted by the flash tube means having a curved reflector;
   a transparent panel covering the periphery of said reflector and receiving flash light projected by said reflector means;
   a filter;
   a casing having an opening through which the flash light is projected;
   housing means located between said reflector means and said casing along one edge of said opening so as to house said filter in a rest position within said casing;
   handle means formed near one edge of said filter and extending outwardly of said opening when said filter is in its rest position;
   means including a pair of guide slots located on one of said filter and said housing means adjacent the filter, and a pair of guide pins located respectively on the other of said filter and the housing means for loose fitting interengagement with said respective guide slots for guiding said filter into said housing means in said casing; and
   means for retaining said filter in its operational position at which said filter covers said opening, said filter being rotatable into its operational position after being slid out from said housing means;
   said guide slots being respectively defined by opposite resilient walls and extending along substantially the entire length of said filter, each of said slots at one of its ends terminating in a slit of a width smaller than that of said respective guide pins; each of said slots ends being brought into engagement with said respective guide pins when said filter is slid outwardly of said housing means, thereby permitting a rotation of said filter about said guide pins, said slits being diametrically enlarged to an extent equal to the diameter of said respective guide pins due to the resiliency of said opposite resilient walls when said filter is pulled outwardly with a force sufficient to pull said pins through said slits, whereby the engagement between said guide slots and guide pins is released.

5. In a flash device according to claim 4, wherein said slots are located on opposite side walls partially defining said housing means and are made of resilient material, and said guide pins are located on a filter frame mounted along at least one pair of opposite edges of said filter.

6. In a flash device according to claim 4, wherein said slots are located on a filter frame mounted along at least one pair of opposite edges of said filter, and are made of resilient material, and said guide pins are located on opposite side walls partially defining said housing means.

7. In a flash device including a flash means having an electric flash tube adapted to emit light along an optical axis when flashed, a curved reflector for projecting the light emitted by the flash tube and a transparent panel covering the front periphery of the reflector and receiving flash light projected by the reflector, a filter holder, comprising:

a casing having side walls and an opening through which the flash light is projected, said opening defining a plurality of edges;

at least one filter having edges;

means for housing said filter in a rest position within said casing substantially parallel to the optical axis of flash light coming from said flash device, said means being located between said flash device and said casing along one edge of said opening;

means including a filter frame mounted along at least one pair of opposite edges of said filter for slidingly guiding said filter parallel to said optical axis within said casing, a pair of guide slots located respectively on one of said frame and said side walls of said casing adjacent said frame, and a pair of guide pins located respectively on the other of said frame and said side walls for loose fitting engagement with said respective guide slots;

the lowermost edge of said opening being in frictional engagement with the lowermost edge of said filter for retaining said filter in an operational position at which said filter covers said opening, said filter being movable into its operational position after being slid out from said housing means, and a locking projection being provided on said casing forwardly of said lowermost edge of said opening, said locking projection being adapted to engage said lowermost edge of said filter when in its operational position to thereby retain said filter in its operational position; and spring means mounted on a wall of said casing within said housing means in resilient contact with said filter in its rest position, to thereby bring said guide slots and said guide pins into pressure contacting relationship with one another so as to retain said filter in its rest position in a stable manner, said locking projection being adapted to release said lowermost edge of said filter against the force of said spring means during a shift of said filter to its rest position, said spring means extending into said opening of said casing and overlying said filter when in its operational position, said spring means thereby pressing against the uppermost edge of said filter when in its operational position, and said spring means serving to enhance the frictional engagement between said lower edge of said filter and said lowermost edge of said opening.

8. The flash device according to claim 7 wherein a plurality of said filters is provided, and wherein said casing comprises;

plural means for housing each said filter in its rest position within said casing, said plural housing means provided at plural portions along the peripheral wall of said opening;

plural guide means for said respective filters; and plural means for retaining respective ones of said filters in an operational position after being movable into such operational position by being slid out from its respective housing means.

9. The flash device according to claim 7, wherein said filter has a projection element thereon near its lowermost edge so as to extend outwardly of said opening when said filter is in its rest position.

10. The flash device according to claim 7, wherein said guide slots are located in said frame, and said filter frame is provided with cut-away portions at said guide slots engaging said guide pins when said filter is in its rest position.

11. In a flash device including a flash means having an electric flash tube adapted to emit light along an optical axis when flashed, a curved reflector for projecting the light emitted by the flash tube and a transparent panel covering the front periphery of the reflector and receiving flash light projected by the reflector, a filter holder, comprising:

a casing having side walls and an opening through which the flash light is projected, said opening defining a plurality of edges;

at least one filter having edges;

means for housing said filter in a rest position within said casing substantially parallel to the optical axis of flash light coming from said flash device, said means being located between said flash device and said casing along one edge of said opening;

means including a filter frame mounted along at least one pair of opposite edges of said filter for slidingly guiding said filter parallel to said optical axis within said casing, a pair of guide slots located respectively on one of said frame and said side walls of said casing adjacent said frame, and a pair of guide pins located respectively on the other of said frame and said side walls for loose fitting engagement with said respective guide slots;

the lowermost edge of said opening being in frictional engagement with the lowermost edge of said filter for retaining said filter in an operational position at which said filter covers said opening, said filter being movable into its operational position after being slid out from said housing means, and a locking projection being provided on said casing forwardly of said lowermost edge of said opening, said locking projection being adapted to engage said lowermost edge of said filter when in its operational position to thereby retain said filter in its operational position; and wherein one of said frame and said side walls in which said guide slots are located is of a resilient material, said slots extending along substantially the entire length of said filter, each of said slots at one of its ends terminating in a slit of a width smaller than that of said respective guide pins; each of said slots ends being brought into engagement with said respective guide pins when said filter is slid outwardly of said housing means, thereby permitting a rotation of said filter frame about said guide pins, said slits being adapted to be diametrically enlarged to an extent equal to the diameter of said respective guide pins due to their resiliency when the filter frame is pulled outwardly with a force sufficient to pull said pins through said slits, whereby the engagement between said guide slots and said guide pins is released.

12. In a flash device including a flash means having an electric flash tube adapted to emit light along an optical axis when flashed, a curved reflector for projecting the light emitted by the flash tube and a transparent panel covering the front periphery of the reflector and receiving flash light projected by the reflector, a filter holder comprising:

a casing having opposed side walls and an opening through which the flash light is projected, said opening defining a plurality of edges;

at least one filter having edges;

means partially defined by said opposed side walls for housing said filter in a rest position therein substantially parallel to the optical axis of flash light coming from said flash device, said means being located between said flash device and said casing along one edge of said opening;

means including guide slots formed on said opposite side walls for slidingly guiding said filter parallel to said optical axis within said casing, said guide means further including a filter frame surrounding said filter and guide pins located on said filter frame and extending into said guide slots, said guide pins being in loose fitting engagement with said respective guide slots;

the lowermost edge of said opening being in frictional engagement with the lowermost edge of said filter in an operational position at which said filter covers said opening, said filter being movable into its operational position after being slid out from said housing means;

spring means mounted on said casing and extending into said housing means, said spring means serving to press against said filter in its rest position to thereby bring said guide pins and said guide slots into pressure contacting relationship with one another so as to retain said filter in its rest position, said spring means including projections located adjacent to said one edge of said opening when the filter is in its rest position, said projections pressing against the uppermost edge of said filter when in its operational position, thereby enhancing the frictional engagement between said lowermost edge of said filter and said lowermost edge of said opening; and said filter means being further defined by an engaging projection located on said casing forwardly of said edge of said opening, said engaging projection being adapted to engage said lowermost edge of said filter when in its operational position, to thereby retain said filter in its operational position, and being adapted to release said lowermost edge of said filter from said engagement against the force of said spring means during the shift of said filter to its rest position from its operational position.

13. The flash device according to claim 12, wherein said filter frame is provided with notches engaging said operational projections of said spring means when said filter is in its rest position.

14. In a flash device including a flash means having an electric flash tube adapted to emit light along an optical axis when flashed, a curved reflector for projecting the light emitted by the flash tube and a transparent panel covering the front periphery of the reflector and receiving flash light projected by the reflector, a filter holder comprising:

a casing having opposed side walls and an opening through which the flash light is projected, said opening defining a plurality of edges;

at least one filter having edges;

means partially defined by said opposed side walls for housing said filter in a rest position therein substantially parallel to the optical axis of flash light coming from said flash device, said means being located between said flash device and said casing along one edge of said opening;

means including guide slots formed on said opposed side walls for slidingly guiding said filter parallel to said optical axis within said casing, said guide means further including a filter frame surrounding said filter and guide pins located on said filter frame and extending into said guide slots, said guide pins being in loose fitting engagement with said respective guide slots;

the lowermost edge of said opening being in frictional engagement with the lowermost edge of said filter in an operational position at which said filter covers said opening, said filter being movable into its operational position after being slid out from said housing means;

wherein said opposed walls in which said guide slots are formed are made of a resilient material, each of said slots at their ends near said opening being provided with slits having a width narrower than the diameter of said respective guide pins, said guide pins engaging said last-mentioned slots ends when said filter frame is pulled out from the casing thereby permitting the rotation of said filter about said guide pins, and said slits being resiliently deformed to an extent equal to the diameter of said respective guide pins when said filter is pulled outwardly with a force sufficient to pull said pins through said slits, thereby releasing the engagement of said guide pins and said guide slots.

* * * * *